Patented Mar. 9, 1954

2,671,749

UNITED STATES PATENT OFFICE 2,671,749

PROCESS FOR PREPARING CHEMICAL COMPOUNDS

Fritz Schultz, Wuppertal-Sonnborn, and Fritz Ziegler, Wuppertal-Elberfeld, Germany, assignors, by mesne assignments, to Farbenfabriken Bayer Aktiengesellschaft, Leverkusen-Bayerwerk, Germany No Drawing. Application September 20, 1951, Serial No. 247,548

Claims priority, application Germany July 6, 1950

1 Claim. (Cl. 167—74.5)

This invention relates generally to processes for producing easily water soluble dry products comprising substances which normally tend to swell or agglutinate when treated with an aqueous solvent. In a more particular sense, the invention is concerned with a process for producing, by dehydration from the frozen state, anhydrous or substantially anhydrous materials comprised in at least part of substances such as polyvinyl-pyrrolidone and the like.

It is known that aqueous solutions of solids, such as penicillin or the like, can be subjected to dehydration while in the frozen state, whereby the solvent is sublimed at low pressure, leaving the solute as a porous mass which can be easily and quickly dissolved in solvent. It is also known that when this process is applied to the dehydration of solutions of materials that swell when treated with a solvent, or which yield viscous solutions, difficulties are encountered when the formation of a solution of the dehydrated solid is attempted. These difficulties, it is thought, are due to the swelling or agglutination of the solvent solid mixture when the solvent is first applied to the dehydrated mass, which prevents the wetting of the remainder of the mass by the solvent and thereby inhibits solution of the solid material in the solvent. The result is that when the dehydrated solute is treated with the solvent, clot-like masses of material are formed which dissolve but very slowly, if at all.

An object of the present invention is to provide a new product, obtained by a method that includes effecting vacuum dehydration of a frozen solution containing at least one material which tends to swell or agglutinate when treated with a solvent, whereby the product so obtained is readily and easily soluble in the solvent without formation of clot-like masses or other inhibition of solution as mentioned above.

In accordance with the present invention, a substance which tends to swell or agglutinate when treated with a solvent is converted into readily soluble form by vacuum dehydration of a frozen viscous solution of the substance as the solute, to which have been added certain readily soluble organic materials which, upon dehydration of the mixture, tend to form a layer surrounding individual particles of the substance which tend to swell or agglutinate, thereby preventing the agglutination or swelling of these particles until after the solvent has had an opportunity to act upon all or substantially all of particles of the dehydrated solute.

Suitable materials for incorporation in aqueous mixtures according to this invention include sugars, for instance cane sugar, glucose or sorbite.

A novel process of this invention has particular application in the field of pharmaceutical chemistry wherein it provides a method for producing a readily soluble dehydrated product containing substances such as polyvinyl-pyrrolidone and combinations of these materials with vitamins, hormones and other chemotherapeutic agents.

It is notable that the dehydrated solid materials prepared in accordance with the process of this invention and including a sugar or sugar-like agent are particularly suitable for use in the preparation of solutions for parenteral administration, because the low osmotic pressure of solutions of these substances allow administration of highly concentrated solutions which are not rendered hypertonic.

To facilitate a fuller and more complete understanding of the process of this invention, the application of the principles of the invention to a process for dehydration of a specific composition will now be described, it being clearly understood that this example is provided by way of illustration, not by way of limitation, of the scope of this invention.

Example

Through a sterile filter, about 500 cc. of an aqueous solution containing 100,000 units of the circulatory hormone callicrein and 90 g. of cane sugar are added to a sterilized solution of 50 g. of polyvinyl pyrrolidone, having a k-value of 90, in 500 cc. of distilled water. The viscous mixture is agitated to assure homogeneity. One cubic centimeter of this mixture contains 100 callicrein units of protracted effect.

If the solution thus prepared is decanted under sterile conditions into wide-necked 5 cc.-ampoules, in such a manner that each ampoule contains 1.5 cc. of liquid, which are then cooled to −40° C., and subjected to dehydration while in the frozen state, the dehydrated product remaining in the ampoule is readily soluble in 1.5 cc. of aqua destillata to yield a clear solution within 1–3 minutes containing 150 units of callicrein.

The additive substance preferred for use in accordance with the present invention is cane sugar.

This application is a continuation-in-part of copending application Serial Number 235,388, filed July 5, 1951. (Case A-1185.)

Having thus described the subject matter of the present invention, what is desired to secure by Letters Patent is:

Process for the manufacture of an easily water-soluble dehydrated solid product containing the circulatory hormone callicrein combined with polyvinylpyrrolidone that comprises forming an essentially homogeneous solution comprising said callicrein polyvinylpyrrolidone compound and sugar in an aqueous solvent medium, freezing said solution and dehydrating the frozen solution under vacuum to yield a porous, easily water-soluble solid product.

FRITZ SCHULTZ.
FRITZ ZIEGLER.

References Cited in the file of this patent

UNITED STATES PATENTS

| Number | Name | Date |
|---|---|---|
| 2,149,304 | Masucci | Mar. 7, 1939 |
| 2,476,082 | Burke | July 12, 1949 |
| 2,487,975 | Koree | Nov. 15, 1949 |

OTHER REFERENCES

Manufacturing Chemist, May 1941, page 115.
Pharmaceutical J., March 16, 1946, page 172.
Flosdorf J. Immunology, volume 50, 1945, page 45.